(12) United States Patent
Yamagami et al.

(10) Patent No.: US 9,315,944 B2
(45) Date of Patent: Apr. 19, 2016

(54) SHEET MANUFACTURING APPARATUS AND METHOD FOR MANUFACTURING SHEET

(71) Applicant: SEIKO EPSON CORPORATION, Tokyo (JP)

(72) Inventors: Toshiaki Yamagami, Nagano (JP); Shunichi Seki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/223,073

(22) Filed: Mar. 24, 2014

(65) Prior Publication Data

US 2014/0290884 A1   Oct. 2, 2014

(30) Foreign Application Priority Data

Mar. 27, 2013 (JP) ................. 2013-065779
Feb. 13, 2014 (JP) ................. 2014-025119

(51) Int. Cl.
| | |
|---|---|
| D21H 23/06 | (2006.01) |
| D21H 23/10 | (2006.01) |
| D21B 1/06 | (2006.01) |
| D21B 1/08 | (2006.01) |
| D21C 5/02 | (2006.01) |
| D21F 9/02 | (2006.01) |
| D21G 9/00 | (2006.01) |

(52) U.S. Cl.
CPC ............... *D21H 23/06* (2013.01); *D21B 1/08* (2013.01); *D21C 5/02* (2013.01); *D21F 9/02* (2013.01); *D21G 9/0018* (2013.01); *Y02W 30/642* (2015.05); *Y02W 30/648* (2015.05)

(58) Field of Classification Search
USPC ............... 162/4, 10, 49, 55, 158, 162, 164.1, 162/168.1–168.6, 181.1–181.8, 164.6, 189, 162/252, 253, 380; 241/24.1, 24.19, 24.29
See application file for complete search history.

(56) References Cited

U.S. PATENT DOCUMENTS

| | | | | |
|---|---|---|---|---|
| 3,607,623 | A | * | 9/1971 | Chappelle .................... 162/252 |
| 3,729,375 | A | * | 4/1973 | Chappelle .................... 162/252 |
| 4,668,339 | A | * | 5/1987 | Terry ...................... D21B 1/08 162/13 |
| 6,010,593 | A | | 1/2000 | Eymin Petot Tourtollet et al. |

(Continued)

FOREIGN PATENT DOCUMENTS

| | | |
|---|---|---|
| EP | 1186706 A2 | 3/2002 |
| EP | 2664708 A1 | 11/2013 |

(Continued)

OTHER PUBLICATIONS

Smook, Gary A., Handbook for Pulp and Paper Technologists, 2nd ed, Angus Wilde Publications, 1992, pp. 98, 209 and 211-212.*

(Continued)

*Primary Examiner* — Dennis Cordray
(74) *Attorney, Agent, or Firm* — Global IP Counselors, LLP (57) ABSTRACT

A present sheet manufacturing apparatus, which manufactures a sheet including defibrated material and whiteness enhancer, is provided with a defibrating unit configured to defibrate a stock material that includes fibers, a whiteness enhancer feeding unit configured to feed the whiteness enhancer to the defibrated material defibrated in the defibrating unit. A feeding amount of the whiteness enhancer is changed based on whiteness information of the stock material or the defibrated material.

7 Claims, 4 Drawing Sheets

(56) References Cited

U.S. PATENT DOCUMENTS 7,645,358 B2 * 1/2010 Raghukumar et al. ............ 162/5
2002/0056531 A1 5/2002 Gehr et al.

FOREIGN PATENT DOCUMENTS

JP 2012-144819 A 8/2012
WO 2005/103373 A2 11/2005

OTHER PUBLICATIONS

Machine translation of WO 2005/103373 A2.*
The extended European Search Report for European Application No. 14161776.1 mailed Jun. 20, 2014.

* cited by examiner

SHEET MANUFACTURING APPARATUS AND METHOD FOR MANUFACTURING SHEET

CROSS-REFERENCE TO RELATED APPLICATIONS

This application claims priority to Japanese Patent Application No. 2013-065779 filed on Mar. 27, 2013 and Japanese Patent Application No. 2014-025119 filed on Feb. 13, 2014. The entire disclosure of Japanese Patent Application Nos. 2013-065779 and 2014-025119 is hereby incorporated herein by reference.

BACKGROUND

1. Technical Field

The present invention related to a sheet manufacturing apparatus and a method for manufacturing sheet.

2. Related Art

In used paper discharged from offices, used paper describing confidential matters is included. Therefore, from the viewpoint of security protection, it is also desired that such used paper can be processed in their offices. In small offices, a wet-type sheet manufacturing apparatus, which uses a large amount of water, cannot be suitably used, and therefore a dry-type sheet manufacturing apparatus simplified in structure has been proposed (see, for example, Japanese Unexamined Laid-open Patent Application No. 2012-144819).

In the aforementioned sheet manufacturing apparatus, a component such as ink particles, etc. included in the fibers is removed by defibrating a used paper. So-called deinking process is performed. However, by the deinking process, it is difficult to totally remove the ink particles, etc. in, for example, the used paper having much amount of prints such as a graph, a picture, etc. printed by the electrographic, or the used paper in which the fiber itself is dyed and printed by the dying ink such as inkjet method, etc. so that there is a problem that a sheet in which the whiteness is low is formed. On the other hand, a stock material of a sheet is not only the printed used paper but also a pulp sheet or a non-printed sheet. Therefore, even when the used paper having much amount of prints is used as a stock material, a certain amount of whiteness enhancer is applied so as to become a sheet having high whiteness. However, there is a problem that when the used paper having low amount of prints or a pulp sheet is used as a stock material, the amount of whiteness enhancer use is exceeded.

SUMMARY

The present invention was made to solve at least a part of the aforementioned objects, and is capable of actualizing as the following embodiments or applied examples.

A sheet manufacturing apparatus according to this applied example that manufactures a sheet including defibrated material and whiteness enhancer is provided with a defibrating unit configured to defibrate a stock material which includes fibers, a whiteness enhancer feeding unit configured to feed the aforementioned whiteness enhancer to the defibrated material defibrated in the defibrating unit, and a controller configured to change a feeding amount of the whiteness enhancer based on the whiteness information of the stock material or the defibrated material.

With this structure, the feeding amount of the whiteness enhancer, which is fed to the defibrated material, is changed based on the whiteness information of the stock material or the defibrated material, for example, information of whiteness or information of stock material (fiber material, form of printing, etc.) etc. Because of this, a sheet having good whiteness can be produced.

In the sheet manufacturing apparatus according to the aforementioned applied example, the feeding amount of the whiteness enhancer is changed based on the whiteness information of the stock material.

With this structure, the feeding amount of the whiteness enhancer, which is fed from the whiteness enhancer feeding unit, is changed based on the whiteness information of the stock material. Because of this, for example, it is possible to change the feeding amount of the whiteness enhancer after checking the whiteness information of the stock material by a whiteness detection device including an optical apparatus or user's visual observation, etc. Accordingly, the change of the feeding amount of the whiteness enhancer becomes easier, and it is possible to provide a simple sheet manufacturing apparatus.

In the sheet manufacturing apparatus according to the aforementioned applied example, the feeding amount of the whiteness enhancer when whiteness in the whiteness information is low is larger than the feeding amount of the whiteness enhancer when the whiteness in the whiteness information is high.

With this structure, larger amount of whiteness enhancer is fed when the stock material has lower whiteness so that a sheet manufacturing apparatus that manufactures a sheet having a good whiteness can be provided.

In the sheet manufacturing apparatus according to the aforementioned applied example, the whiteness information is the information related to the stock material.

With this structure, the information related to the stock material can be obtained so that the feeding amount of the whiteness enhancer can be changed with consideration of, for example, a fiber material or a form of printing.

In the sheet manufacturing apparatus according to the aforementioned applied example, the information related to the stock material is the information that indicates how the stock material has been printed.

With this structure, by obtaining the information that indicates what printing method was used for printing the stock material, the reduction of the whiteness depending on the form of printing can be suppressed.

In the sheet manufacturing apparatus according to the aforementioned applied example, the information related to the stock material indicates that the feeding amount of the whiteness enhancer when the stock material is printed by the inkjet device is larger than the feeding amount of the whiteness enhancer when the stock material is not printed by the inkjet device.

For example, a sheet that was printed by the inkjet device is different from a sheet that was not printed by the inkjet device because the ink is soaked in the fibers that configures the sheet, and the fibers itself are dyed. Because of this, in the sheet printed by the inkjet device, the sheet having lower whiteness is formed. Therefore, in the configuration of the present example, when the stock material is printed by the inkjet device, larger amount of the whiteness enhancer is fed in comparison with the case that the stock material is not printed by the inkjet device so that the whiteness can be improved. Accordingly, it is possible to provide the sheet manufacturing apparatus in which a sheet having good whiteness as same as a sheet printed by other than the inkjet device can be produced even though the sheet is printed by the inkjet device.

In the sheet manufacturing apparatus according to the aforementioned example, the feeding amount of the whiteness enhance is changed based on the whiteness information of the defibrated material.

With this structure, the feeding amount of the whiteness enhancer that is fed from the whiteness enhancer feeding unit is changed based on the whiteness information of the defibrated material. That is, it is possible to obtain the whiteness information of the defibrated material so as to manufacture a sheet having good whiteness.

In the sheet manufacturing apparatus according to the aforementioned applied example, the feeding amount of whiteness enhancer when the whiteness in the whiteness information is low is larger than the feeding amount when the whiteness in the whiteness information is high.

With this structure, in the case that the defibrated material in which the whiteness is low is used, larger amount of the whiteness enhancer is fed so that a sheet having good whiteness can be manufactured.

In the sheet manufacturing apparatus according to the aforementioned applied example, a strengthening agent feeding unit configured to feed a strengthening agent is provided, and when the feeding amount of the whiteness enhancer is large, larger amount of the strengthening agent is fed in comparison with when the feeding amount of the whiteness enhancer is low.

With this structure, since the strength of the sheet tends to be lower when the feeding amount of the whiteness enhancer is large, large amount of the strengthening agent is fed depending on the feeding amount of the whiteness enhancer so that the whiteness can be improved and the strength of the sheet itself can be secured.

A method for manufacturing sheet according to the present applied example includes a defibrating process for generating defibrated material by defibrating a stock material which includes fibers, a whiteness information acquiring process for acquiring whiteness information of the stock material or the defibrated material, and a feeding amount changing process for changing a feeding amount of the whiteness enhancer to the defibrated material based on the whiteness information.

With this structure, the feeding amount of the whiteness enhancer is changed based on the whiteness information of the stock material or the defibrated material, for example, information of the whiteness or information of the stock material (fiber material, form of printing, etc.) etc. Because of this, since an appropriate whiteness enhancer is fed, a sheet having good whiteness can be manufactured for various defibrated material.

BRIEF DESCRIPTION OF THE DRAWINGS

Referring now to the attached drawings which form a part of this original disclosure.

DETAILED DESCRIPTION OF EXEMPLARY EMBODIMENTS

Embodiment

Hereinafter, the embodiment of the present invention will be explained with reference to the drawings. In each of the following drawings, the scale of each member, etc., is shown so as to be different from the actual scale to make each member, etc., recognizable size.

Initially, a structure of a sheet manufacturing apparatus will be explained. The sheet manufacturing apparatus is capable of changing a feeding amount of a whiteness enhancer based on whiteness information of a stock material and a defibrated material. And, a sheet is manufactured through a whiteness information acquiring process, which acquires whiteness information of the stock material and the defibrated material, and a feeding amount changing process, which changes the feeding amount of the whiteness enhancer based on the whiteness information. By the way, the sheet manufacturing apparatus according to the present embodiment is provided based on, for example, a technology producing a new sheet recycled from a used paper by a dry-type which minimizes water usage. Further, a sheet as a stock material supplied to the sheet manufacturing apparatus according to the present embodiment is, for example, used paper (stock material Pu) or a pulp sheet of A4 size, etc., which is a mainstream size in offices. Hereinafter, concrete explanation will be made.

Figure 1:
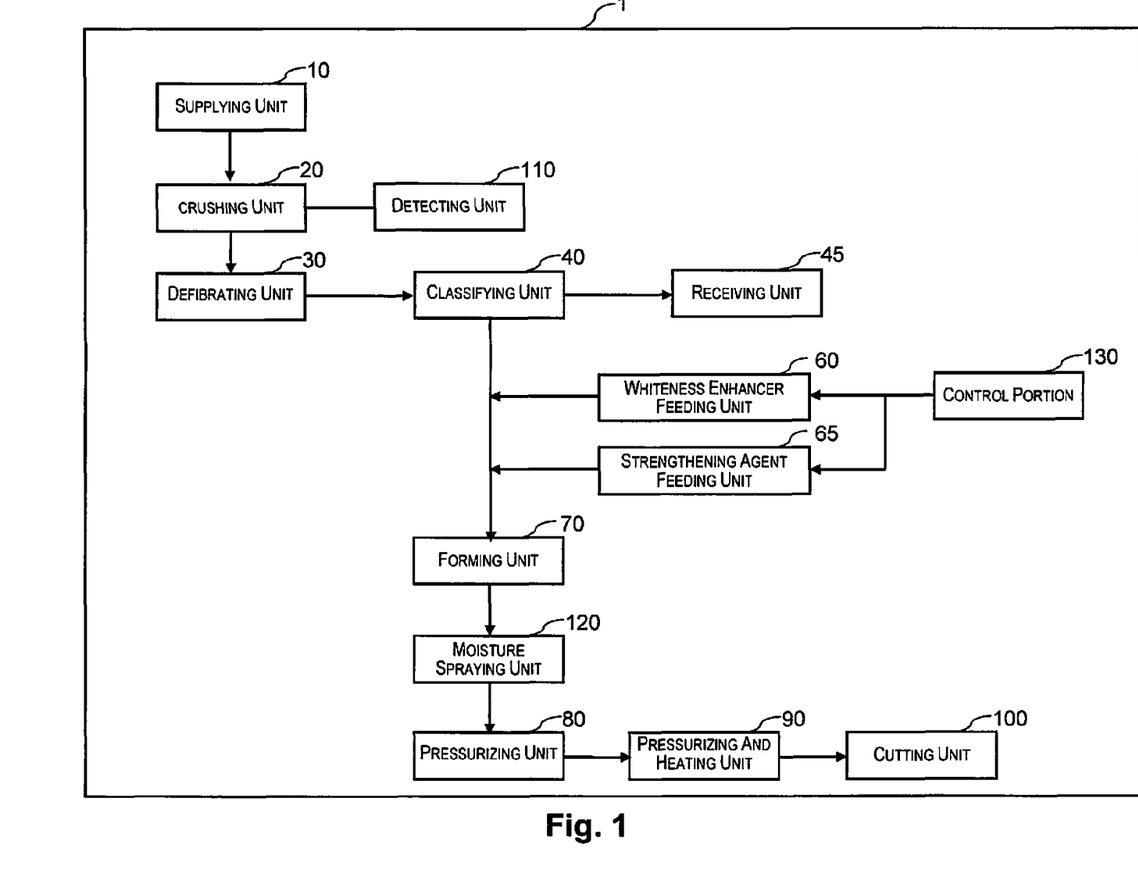
FIG. 1 is a schematic view showing a structure of a sheet manufacturing apparatus.
Figure 2:
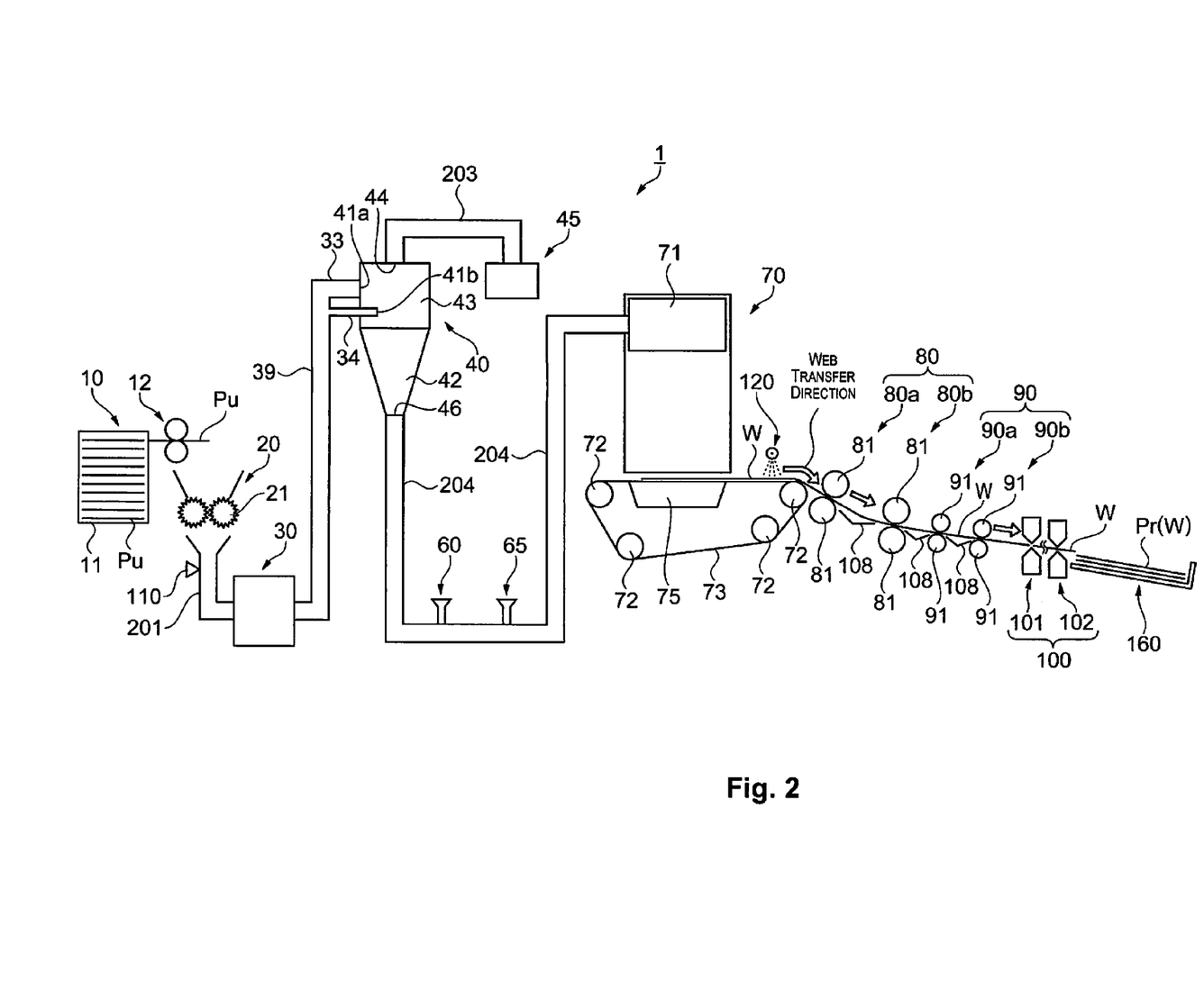
FIG. 2 is another schematic view showing a structure of the sheet manufacturing apparatus.
Figure 3:
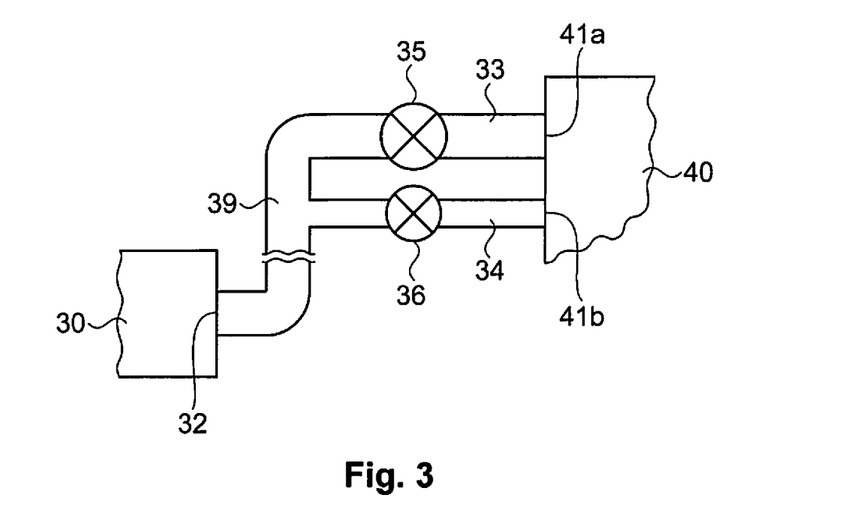
FIG. 3 is a detail view showing a partial structure of the sheet manufacturing apparatus.
Figure 4:
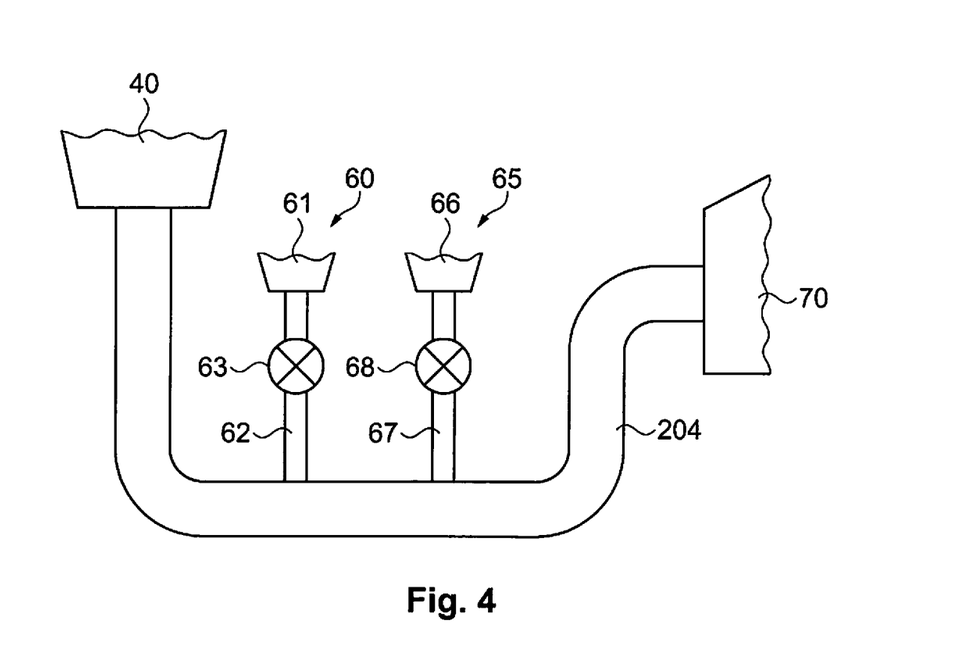
FIG. 4 is a detail view showing another partial structure of the sheet manufacturing apparatus.

FIGS. 1 and 2 are a schematic view showing a structure of the sheet manufacturing apparatus. FIG. 3 is a detail view showing a partial structure of the sheet manufacturing apparatus. FIG. 4 is a detail view showing another partial structure of the sheet manufacturing apparatus.

As shown in FIG. 1, the sheet manufacturing apparatus 1 is provided with a supplying unit 10, a crushing unit 20, a defibrating unit 30, a classifying unit 40, a receiving unit 45, a forming unit 70, a moisture spraying unit 120, a pressurizing unit 80, a pressurizing and heating unit 90, and a cutting unit 100. In addition, as a detecting unit 110 that acquires whiteness information of stock material Pu, a whiteness enhancer feeding unit 60 and a strengthening agent feeding unit 65, etc. are provided. And, a controller 130 that controls these portions is provided.

The supplying unit 10 supplies a stock material Pu to the crushing unit 20. The supplying unit 10 is provided with a tray 11 for loading a plurality of stock material Pu thereon in a stacked manner, an automatic feeder 12 capable of continuously feeding the stock material Pu loaded on the tray 11 to the crushing unit 20, etc.

The crushing unit 20 cuts the supplied stock material Pu into small square pieces of several centimeters. The crushing unit 20 is provided with a crushing blade 21, constituting a device including a shredding blade having a width wider than a width of a normal shredder. With this, the supplied stock material Pu can be easily cut into small pieces. The small pieces are supplied to a defibrating unit 30 via piping 201.

Here, the sheet manufacturing apparatus 1 is provided with the detecting unit 110 that detects whiteness included in the whiteness information of the stock material (small piece). In the present embodiment, the detecting unit 110 is arranged in the piping 201 between the crushing unit 20 and the defibrating unit 30, and there is a configuration so as to be capable of detecting whiteness of small square pieces of several centimeters. The detecting unit 110 is provided with an optical sensor so that it is possible to detect whiteness by detecting reflection light from the small pieces. By the way, other than the optical sensor, an imaging means such as CCD camera, etc. may be applied so that whiteness may be detected by analyzing image data based on data acquired by the imaging means. Further, the small pieces are made by just cutting the stock material Pu so the whiteness of the small pieces is nearly unchanged from the whiteness of the stock material Pu. Therefore, the whiteness of the small pieces may be the whiteness of the stock material.

The defibrating unit 30 is provided with a rotatable rotary blade, and is configured to defibrate the small pieces supplied from the crushing unit 20 into a fibrous (cotton-like) form. By the way, the defibrating unit 30 of this embodiment performs a dry-type defibrating operation to be performed not in water but in air.

In the defibrating unit 30, a dry-type defibrating apparatus equipped with, for example, a disk refiner, a Turbo-Mill (made by Turbo Kogyo Co., Ltd.), a Ceren-Miller (made by Masuko Sangyo Co., Ltd), and/or a wind generation mechanism can be arbitrarily applied.

The size of small piece to be introduced to the dry-type defibrating unit 30 can be a size similar to a size of a piece discharged from a normal shredder.

By the defibrating process of the defibrating unit 30, coating materials, etc., to a stock material such as e.g., printed ink, tonner, blot inhibitor, will be also released from the state of adhering to fibers (hereinafter referred to as "ink particles"). Therefore, the defibrated material produced from the defibrating unit 30 are fibers and ink particles obtained by defibrating the small particles.

It has a mechanism in which airflow is generated by the rotation of the rotary blade, and the defibrated fibers and ink particles are transferred to the classifying unit 40 by being carried by the airflow. In the case of using a dry-type defibrating unit 30 not equipped with a wind generation mechanism, it is recommended to separately provide an airflow generator for generating airflow from the crushing unit 20 toward the defibrating unit 30.

Here, a connection structure of the defibrating unit 30 and the classifying unit 40 will be explained. The defibrating unit 30 and the classifying unit 40 are connected by the pipings 39, 33, 34, and there is a configuration that the defibrated material defibrated by the defibrating unit 30 are carried to the classifying unit 40 through the pipings 39, 33, 34.

In the present embodiment, as shown in FIG. 3, the piping 39, which is connected to the discharge port 32 of the defibrating unit 30, is separated into the first piping 33 and the second piping 34 in the middle and is extended, and the end portions of the first piping 33 and the second piping 34 are connected to installation ports 41a, 41b of the classifying unit 40.

The pipe diameter of the second piping 34 is smaller than the pipe diameter of the first piping 33. Further, the first valve 35 is provided in the middle of the first piping 33, and the second valve 36 is provided in the middle of the second piping 34. The defibrated material is carried to the classifying unit 40 through the first piping 33 by opening the first valve 35 and closing the second valve 36. On the other hand, the defibrated material is carried to the classifying unit 40 through the second piping 34 by opening the second valve 36 and closing the first valve 35.

The classifying unit 40 separates the carried defibrated material into the ink particles and fibers and the ink particles are removed. A cyclone 40 is applied as the classifying unit 40 of the present embodiment. The cyclone 40 is preferably a tangent input system cyclone which is relatively simple in structure. As the classifying unit 40, an airflow-type classifier of another type can be used in place of the cyclone 40. In this case, as an airflow-type classifier other than the cyclone 40, for example, an Elbow-Jet, an EID classifier, etc., can be used. An airflow-type classifier generates swirling airflow to perform separation and classification by the difference of the received centrifugal force due to the size and density of the defibrated material, and can adjust the classification point by adjusting the airflow velocity and/or the centrifugal force.

The cyclone 40 of the present embodiment is configured by installation ports 41a, 41b in which the defibrated material is introduced from the defibrating unit 30, a cylindrical portion 43 in which the installation ports 41a and 41b are provided in the tangential direction, a conical portion 42 which is connected to the cylindrical portion 43, a lower outlet 46, which is provided in the lower portion of the conical portion 42, and an upper exhaust port 44 for discharging fine powders which is provided in the upper middle of the cylindrical portion 43.

In the classification processing, the airflow carrying defibrated material introduced from the installation ports 41a, 41b of the cyclone 40 changes to a circular movement in the cylindrical portion 43 and moves to the conical portion 42. Depending on the difference of the centrifugal force received by the size and the density of the defibrated material, separation and classification are performed.

When classified the substances contained in the defibrated material into two types, fibers and ink particles other than the fibers, fibers are larger in size or higher in density than ink particles. For this reason, the defibrated material is separated into ink particles smaller in size and lower in density than fibers and fibers larger in size and higher in density than ink particles by the classification processing.

The separated ink particles are discharged to the upper exhaust port 44 as fine powder together with air. From the upper exhaust port 44 of the cyclone 40, ink particles relatively lower in density are discharged. The discharged ink particles are collected to the receiving unit 45 through the piping 203 from the upper exhaust port 44 of the cyclone 40. On the other hand, the fibers larger than ink particles and higher in density are carried toward the forming unit 70 from the lower outlet of the cyclone 40 as the defibrated fibers. Because of this, the defibrated material is removed from the ink particles and deinking is performed.

In the present embodiment, as shown in FIG. 4, in the middle of the piping 204 in which the defibrated fibers are transferred from the cyclone 40 to the forming unit 70, the whiteness enhancer feeding unit 60, which feeds whiteness enhancer to the defibrated fibers, is provided.

The whiteness enhancer is the powder to be combined and added for securing whiteness when a sheet is formed by the defibrated fibers. Since the ink particles cannot be totally removed even when deinking is performed by the classification processing of the cyclone 40, the whiteness enhancer is fed to the defibrated fibers.

As the whiteness enhancer, it is preferable to use an agent containing at least one of calcium carbonate, clay, kaolin, talc, silica, titanium oxide, barium sulfate, and starch. Further, the size of the powder of the whiteness enhancer is important so as to easily disperse in the airflow, and the particle size is preferably from 0.1 μm to 10 μm. When the particle size is smaller than 0.1 μm, the whiteness enhancer wafts in the airflow so that the particles may be suctioned in the suction apparatus in the later process, or it may not be remained between the defibrated fibers. In addition, a degree of shielding is reduced so that it is difficult to improve whiteness. On the other hand, when the particle size is more than 10 μm, the mixture becomes insufficient, or in a case of forming a sheet, it cannot be remained in the defibrated fibers and drops off so that it may not demonstrate the appropriate functions.

As a concrete configuration, as shown in FIG. 4, the whiteness enhancer feeding unit 60 is provided with a whiteness enhancer hopper 61 that retains the whiteness enhancer and a whiteness enhancer carrier pipe 62 that connects between the whiteness enhancer hopper 61 and the piping 204. Further, a whiteness enhancer adjustment valve 63 is provided in the middle of the whiteness enhancer carrier pipe 62.

In the present embodiment, the pipe diameter of the whiteness enhancer carrier pipe 62 is smaller than the pipe diameter of the piping 204. In such configuration, the wind velocity increases so that the whiteness enhancer can be easily dispersed in the airflow. The feeding amount of the whiteness enhancer, which retains in the whiteness enhancer hopper 61, to the piping 204 is adjusted by the whiteness enhancer adjustment valve 63, and it is supplied to the piping 204 through the whiteness enhancer carrier pipe 62. Therefore, the whiteness enhancer can be mixed (fed) to the defibrated fibers carried from the cyclone to the forming unit 70.

Further, in the present embodiment, a strengthening agent feeding unit 65 that feeds strengthening agent is provided in the middle of the piping 204 in which the defibrated fibers are carried from the cyclone 40 to the forming unit 70.

The strengthening agent is added to impart strength the strength to a sheet formed by using the defibrated fibers. Also, when the feeding amount of the whiteness enhancer is large, the strength of sheet is lowered so that the powder is mixed and added to support the strength of the sheet itself. As the strengthening agent, it is preferable to use an agent containing at least one of polyacrylamide polyamide epichlorohydrin, polyvinyl alcohol starch, etc.

As a concrete configuration, as shown in FIG. 4, the strengthening agent feeding unit 65 is provided with a strengthening agent hopper 66 that retains strengthening agent and a strengthening agent carrier pipe 67 that connects between the strengthening agent hopper 66 and the piping 204. Further, the strengthening agent adjustment valve 68 is provided in the middle of the strengthening agent carrier pipe 67. In the present embodiment, the pipe diameter of the strengthening agent carrier pipe 67 is smaller than the pipe diameter of the piping 204. In this configuration, the wind velocity increases and the strengthening agent is dispersed in the airflow. And, the feeding amount of the strengthening agent, which retains in the strengthening agent hopper 66, to the piping 204 is adjusted by the strengthening agent adjustment valve 68, and it is supplied to the piping 204 through the strengthening agent carrier pipe 67. Because of this, the strengthening agent can be mixed (fed) to the defibrated fibers carried from the cyclone 40 to the forming unit 70.

Also, in the present embodiment, the strengthening agent feeding unit 65 is arranged downstream side from the whiteness enhancer feeding unit 60. In this configuration, it makes easier to add the whiteness enhancer at a timing earlier than the timing of adding the strengthening agent to the defibrated fibers carried through the piping 204. That is, the whiteness enhancer can be strongly adhered to the defibrated fibers. Therefore, when it becomes a sheet, dropping off the particles of whiteness enhancer can be prevented.

Because of this, the whiteness enhancer and/or the strengthening agent are fed after the defibrating process and the deinking process were performed, and the defibrated fibers in which the whiteness enhancer and/or the strengthening agent were mixed, are carried to the forming unit 70.

A sheet is formed by using the mixture of additive agent and the defibrated fibers. Then, the additive agent in which the whiteness enhancer and/or strengthening agent, fusion-bondable resin, etc. are mixed is called as material fibers. The forming unit 70 is that the material fibers are deposited in a uniform thickness. The forming unit 70 has a mechanism that uniformly disperses the material fibers in the air, and a mechanism that suctions the material fibers on the mesh belt 73.

Further, as the mechanism that uniformly disperses the material fibers in the air, a forming drum 71 that feeds the material fibers to the inside portion is arranged in the forming unit 70. Because of this, the whiteness enhancer and/or the strengthening agent can be uniformly mixed in the defibrated fibers. Small holes screen is provided on the surface of the forming drum 71. The material fibers can be uniformly dispersed in the air by getting the material fibers through the small holes screen by rotationally driving the forming drum 71.

On the other hand, in a direction vertically downward from the forming drum 71, an endless mesh belt 73, which forms mesh, is arranged. The mesh belt 73 is stretched by a plurality of stretching rollers 72, and at least one of the stretching rollers 72 is rotated so as to move it in one direction.

Further, in a direction vertically downward from the forming drum 71, through the mesh belt 73, a suction apparatus 75 that generates airflow in a direction vertically downward is provided. The material fibers dispersed in the air can be suctioned on the mesh belt 73.

When the material fibers are introduced in the forming drum 71 of the forming unit 70, the material fibers go through the small holes screen of the surface of the forming drum 71 and are deposited on the mesh belt 73 by the suction power of the suction apparatus 75. At this time, the material fibers can be deposited in a uniform thickness by moving the mesh belt 73 in one direction. The deposit including such deposited material fibers is called as web W.

The mesh belt may be made by a metallic, a resin, or a nonwoven fabric and it may be anything so that the material fibers can be deposited and the airflow can be getting through. By the way, when the hole diameter of the mesh is too large, the surface of the sheet becomes unevenness. When the hold diameter of the mesh is too small, it may be difficult to produce stable airflow by the suction apparatus 75.

The suction apparatus 75 forms a sealed box in which a desired size window is opened below the mesh belt, and a stable airflow can be produced by suctioning air in the box from other than the window and reducing pressure in the box.

The web W is transferred in a web transfer direction, which is shown by an arrow in FIG. 2, by moving the mesh belt 73. The moisture spraying unit 120 sprays and adds water toward the transferred web W. Because of this, hydrogen bonding between fibers can be enhanced. The web W in which water was sprayed and added is transferred to the pressurizing unit 80.

The pressurizing unit 80 is to pressurize the transferred web W. The pressurizing unit 80 is provided with two pairs of pressure rollers 81. By making the web W to which moisture was sprayed pass through between the opposed pressure rollers 81, the web W is compressed. The compressed web W is transferred to the pressurizing and heating unit 90.

The pressurizing and heating unit 90 simultaneously performs pressurizing and heating of the transferred web W. The pressurizing and heating unit 90 is provided with two pairs of heating rollers 91. By making the compressed web W pass through between the opposed heating rollers 91, the web is heated and pressurized.

In a state in which the distance between fibers is shortened and the number of contacts between fibers is increased by the pressure rollers 81, the fusion-bondable resin is molten by the heating rollers 91 to connect fibers with each other. This enhances the strength as a sheet and dehydrates to remove excessive moisture, enabling a production of an excellent sheet. The heating is preferably performed by arranging heaters in the heating rollers 91 to simultaneously perform pressurizing and heating of the web W. Below the pressure rollers 81 and the heating rollers 91, guides 108 for guiding the web W are arranged.

The sheet (web W) obtained as mentioned above is transferred to the cutting unit 100. The cutting unit 100 is provided with a cutter 101 for cutting the web in the transfer direction and a cutter 102 for cutting the web in a direction perpendicular to the transfer direction, so that the sheet formed in an elongated manner is cut into a desired size. The cut sheets Pr (web W) is stacked on the stacker 160.

Figure 5:
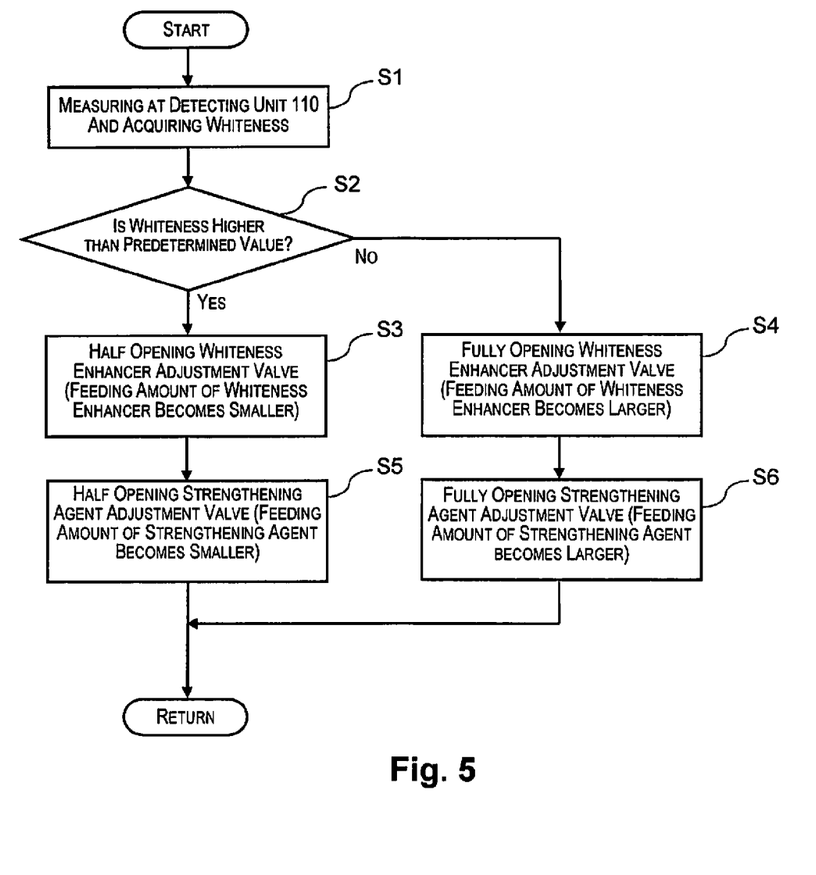
FIG. 5 is a flow chart showing a control of the sheet manufacturing apparatus.

Next, the control method of the aforementioned sheet manufacturing apparatus will be explained. Concretely, the control method that changes the feeding amount of the whiteness enhancer based on the whiteness information of the defibrated material will be explained. FIG. 5 shows a flow chart showing a control of the sheet manufacturing apparatus.

Initially, a whiteness information acquiring process that acquires whiteness of small pieces, which were crushed in the crushing unit, as the whiteness information is performed. Concretely, the whiteness of the small pieces before defibrating by the defibrating unit 30 is measured and acquired in the detecting unit 110 (step S1). That is, the whiteness is acquired by driving the optical sensor of the detecting unit 110 and detecting the reflection light from the small pieces.

Next, a feeding amount changing process that changes the feeding amount of the whiteness enhancer by adjusting opening closing amount of the whiteness enhancer adjustment valve 63 based on the acquired whiteness is performed.

Concretely, the controller 130 determines whether or not the acquired whiteness is higher than the predetermined value (step S2).

When the whiteness is lower than the predetermined value (step S2: NO), the whiteness enhancer adjustment valve 63 is fully opened (step S4).

That is, when the whiteness is lower than the predetermined value, the whiteness enhancer adjustment valve 63 is opened more than the opening amount when the whiteness is high so that the feeding amount of the whiteness enhancer is larger than the feeding amount when the whiteness is high. Therefore, even when the small pieces have low whiteness, a sheet having high whiteness can be produced.

On the other hand, when the whiteness is higher than the predetermined value (step S2), the whiteness enhancer adjustment valve 63 is half opened (step S3).

That is, when the whiteness is higher than the predetermined value, the whiteness enhancer adjustment valve 63 is closed so that the feeding amount of the whiteness enhancer becomes smaller that the feeding amount when the whiteness is low. Therefore, unnecessary feeding of the whiteness enhancer is suppressed, and the reduction of strength of a sheet can be prevented.

In the processes of FIG. 5, it was determined from two cases such that the whiteness is higher or lower than the predetermined value. However, it is not limited to this, and a plurality of threshold values may be set so that it may be determined from more than three cases. Even when there are two or more than three cases, the feeding amount of the whiteness enhancer in the first case of the whiteness of the crushed small pieces becomes larger than the feeding amount of the whiteness enhancer in the case that the whiteness is higher than the first case of the whiteness of the crushed small pieces. In other words, the feeding amount of the whiteness enhancer when the whiteness is lower is larger than the feeding amount of the whiteness enhancer when the whiteness is higher. Further, the processes that the whiteness enhancer adjustment valve 63 is fully opened or is half opened are an example so that it is appropriately determined from number of cases, or the effect by feeding the whiteness enhancer.

Next, the feeding amount of the strengthening agent is changed by adjusting opening closing amount of the strengthening agent adjustment valve 68 of the strengthening agent feeding unit 65 based on the feeding amount of the whiteness enhancer in Steps S3 and S4. When an inorganic material is specifically used as the whiteness enhancer, the strength of the formed sheet tends to be reduced depending on the feeding amount. Therefore, the feeding amount of the strengthening agent is changed depending on the feeding amount of the whiteness enhancer.

Concretely, when the whiteness enhancer adjustment valve 63 is half opened in step S3 and the feeding amount of the whiteness enhancer is reduced, the controller 130 half opens the strengthening agent adjustment valve 68 and the feeding amount of the strengthening agent is reduced (step S5).

That is, when the feeding amount of the whiteness enhancer is reduced, the feeding amount of the strengthening agent is reduced by closing the strengthening agent adjustment valve 68 so that the closing amount is more than the closing amount when the feeding amount of the whiteness enhancer is increased. Therefore, the feeding of unnecessary strengthening agent can be suppressed.

On the other hand, when the feeding amount of the whiteness enhancer is increased by fully opening the whiteness enhancer adjustment valve 63, the controller 130 fully opens the strengthening agent adjustment valve 68 so that the feeding amount of the strengthening agent is increased (step S6).

That is, when the feeding amount of the whiteness enhancer is increased, the feeding amount of the strengthening agent is increased by opening the strengthening agent adjustment valve 68 so that the opening amount is more than the opening amount when the feeding amount of the whiteness enhancer is large. Therefore, the reduction of the strength of sheet when the feeding amount of the whiteness enhancer is large can be suppressed.

The feeding amount of the whiteness enhancer is changed based on the whiteness so that the feeding amount of the strengthening agent may be changed based on whiteness instead of the feeding amount of the whiteness enhancer.

Further, in the present embodiment, the wind velocity that is generated toward the cyclone 40 from the defibrating unit 30 is controlled based on the acquired whiteness. Specifically, the wind velocity is controlled by opening and closing the first valve 35 or the second valve 36 provided in the first piping 33 and the second piping 34.

In this time, when the acquired whiteness is low, the first valve 35 is closed and the second valve 36 is opened. Therefore, the pipe diameter of the second piping 34 is smaller than the pipe diameter of the first piping 33 so that the wind velocity can be increased more. Further, by increasing the wind velocity, the deinking process in the cyclone 40 is increased and impurities such as ink particles can be easily removed in the receiving unit 45 side.

On the other hand, when the acquired whiteness is high, the second valve 36 is closed and the first valve 35 is opened. Therefore, the pipe diameter of the first piping 33 is larger than the pipe diameter of the second piping 34 so that the wind velocity is reduced more. Further, by reducing the wind velocity, executing unnecessary deinking process can be suppressed.

Accordingly, a condition of deinking can be changed by opening and closing the first valve 35 and the second valve 36.

According to the aforementioned embodiments, the following effects can be obtained.

(1) The whiteness of small pieces crushed by the crushing unit 20 was acquired, and the feeding amount of the whiteness enhancer was changed based on the acquired whiteness, and the changed amount of the whiteness enhancer is fed to the defibrated fibers. Therefore, even when the whiteness of the stock material Pu supplied by the supplying unit 10 is respectively changed, an appropriate amount of whiteness enhancer is fed so that a sheet having uniform whiteness can be easily produced.

(2) The feeding amount of the strengthening agent was changed based on the feeding amount of the whiteness enhancer, and the changed amount of the strengthening agent was fed to the fibers (defibrated fibers). Therefore, the reduction of the strength of sheet when an inorganic material is specifically used as the whiteness enhancer can be prevented.

It should be noted that the present invention is not limited to the aforementioned embodiments, and various changes and/or improvements can be made on the aforementioned embodiments. Hereinafter, modified embodiments will be described.

Modified Example 1

In the aforementioned embodiments, the feeding amount of the whiteness enhancer is changed based on the whiteness in the whiteness information. However, it is not limited to this. For example, the whiteness information may be information related to a stock material, and the feeding amount of the whiteness enhancer may be changed based on the information. Therefore, the feeding amount of the whiteness enhancer can be changed with consideration for a fiber material or form of printing of a stock material.

For example, the information related to a stock material may be information that indicates what printing method was used for printing the stock material. A sheet manufacturing apparatus is provided with an input portion that inputs whether the printing device used by the user is an offset printing, an electrophotographic print, or inkjet method. The sheet manufacturing apparatus acquires information inputted by the input portion. Based on the acquired information, it determines whether or not the printing device is an inkjet method. The feeding amount of the whiteness enhancer is changed by table data that defines the feeding amount of the whiteness enhancer depending on a form of printing (printing method), and a sheet is manufactured.

In this case, when the information related to the stock material is a sheet printed by the inkjet device, the feeding amount of the whiteness enhancer is larger than the feeding amount when the information is a sheet not printed by the inkjet device. This is because the ink in the inkjet device is difficult to be separated at the time of defibrating in the defibrating unit 30 in comparison with toner of the offset printing or the electrophotographic method.

With this, when the stock material is a sheet printed by the inkjet device, the feeding amount of the whiteness enhancer is fed larger than the feeding amount when a sheet is printed by the offset printing or the electrophotographic method. Because of this, even when a sheet in which the fibers itself are dyed by the inkjet device is used, a sheet having high whiteness can be manufactured. As the information that is inputted to the input portion, the offset printing or the combination of the electrophotographic method and the inkjet method may be used. Further, the information may be whether or not the inkjet method is used. By the way, in the case of the present modified example 1, it is possible to omit the detection potion 110 that detects whiteness so that the device configuration can be simplified.

Modified Example 2

In the aforementioned embodiments, the detecting unit 110 is arranged in the crushing unit 20, and the feeding amount of the whiteness enhancer is changed based on the acquired whiteness for the stock material in the defibrating unit 30. However, it is not limited to this.

The detecting unit 110 is arranged upstream side from the whiteness enhancer feeding unit 60. For example, the detecting unit 110 is arranged in the piping 39 between the defibrating unit 30 and the classifying unit 40, and the feeding amount of the whiteness enhancer may be changed based on the whiteness information of defibrated material that was performed by the defibrating process of the defibrating unit 30. Further, the detecting unit 110 is arranged in the piping 204 between the classifying unit 40 and the whiteness enhancer feeding unit 60, and the feeding amount of the whiteness enhancer may be changed based on the whiteness information of defibrated fibers that were classified by the classifying unit 40. When the detecting unit 110 is provided in the piping 204, the partial or entire piping is made transparent and the inside is detected by the optical sensor or the CCD camera.

In addition, the detecting unit 110 that detects the whiteness of the stock material placed on the supplying unit 10 is arranged, and the feeding amount of the whiteness enhancer may be changed based on the whiteness information of the stock material placed on the supplying unit 10. For example, when the stock material placed on the supplying unit 10 is a sheet, one side or both sides of the sheet is scanned, and a ratio of printing area with respect to the sheet is detected, and the whiteness is calculated. It may be changed that the feeding amount of the whiteness enhancer when the whiteness in the whiteness information is low is fed larger than the feeding amount when the whiteness in the whiteness information is high. With this, the effects, which are similar to the aforementioned effects, can be obtained.

Modified Example 3

In the aforementioned embodiments, the strengthening agent feeding unit 65 is provided, and powdered strengthening agent was fed, but it is not limited to this. The strengthening agent feeding unit 65 may be omitted and for example, the amount of the strengthening agent in response to the feeding amount of the whiteness enhancer is added in water to be sprayed by the moisture spraying unit 120 so that there may be a configuration that the water in which the strengthening agent was added is sprayed to the fibers. As a strengthening agent, it is preferable to use an agent containing at least one of polyacrylamide, polyamide epichlorohydrin, polyvinyl alcohol, starch, or any combination. With this, the strengthening agent can be easily combined with fibers.

Modified Example 4

In the aforementioned embodiment, the whiteness enhancer and the strengthening agent are mixed with defibrated fibers, but also sizing agent may be mixed with the fibers. As a sizing agent, polyacrylamide, polyvinyl alcohol, alkyl ketene dimer, alkenyl succinic anhydride, rosin soap, etc. may be used. With this, when the defibrated fibers are formed as a sheet, bleeding can be prevented.

Modified Example 5

As the sheet in this application, it is mainly said that a sheet is made from plant fibers such as cellulose, etc. as a stock material. However, it is not limited to this, and it may be a board shape, a web shape, or a shape having irregularities. Further, as the stock material, it may be plastic fibers such as polyethylene terephthalate (PET), etc., or animal fibers such as wool, etc. That is, it includes fibers as a stock material in which the whiteness needs to be improved. Concretely, it includes a sheet that a pure pulp as a stock material is formed into a sheet shape, a recycled sheet that a used paper as a stock material is formed into a sheet shape, a nonwoven fabric, a fiber board, a tissue paper, kitchen paper, cleaner, filter, liquid absorbing material, sound absorber, cushioning material, mat, etc.

Modified Example 6

In the aforementioned embodiments, the classifying unit 40 may be removed. In this case, the whiteness enhancer is not fed to the defibrated fibers, and the whiteness enhancer is fed to the defibrated material. Even if the classifying unit 40 is provided or not provided, whiteness enhancer is fed to the defibrated material that was processed in the defibrating process of the defibrating unit 30. In the case that the classifying unit 40 is provided, since the deinking is performed to the defibrated material, the whiteness is improved so that whiteness is more improved after mixing with the whiteness enhancer.

EXAMPLE

Next, a concrete example according to the present invention will be described.

Calcium carbonate (Shiraishi Calcium Co., Ltd., Shiraishi Calcium Co., Ltd. Softon 3200 average particle diameter of 0.7 μm, Shiraishi Calcium Co., Ltd., Shiraishi Calcium Col, Ltd. Softon 1500 average diameter of 1.5 μm) as a whiteness enhancer is fed in the airflow of defibrated fibers transferred in the piping to become 10% of fiber weight.

Inorganic Material Remaining Amount

The amount of inorganic material taken in the recycled sheet, which is obtained by the sheet reproducing device of the present invention, is evaluated as a remaining amount at 800° C. by the obtained recycled sheet and performing Thermo Gravimetry Analyzer (TGA) (thermogravimetric determination) in nitrogen. The following results are obtained so that it is confirmed that the whiteness enhancer was mixed to the recycled sheet.
○No addition of whiteness enhancer 18%
○Addition of Softon 3200 as the whiteness enhancer 25%
○Addition of Softon 1500 as the whiteness enhancer 26%

Example 1

The printed used paper was shredded and became approximately 2×8 mm of the small pieces. The whiteness of the small pieces was measured by the optical sensor. The sensing took an average of approximately 30 seconds, and the total average level was quantified in 10 level scale of 1 to 10 (1 black to 10 white).

The calcium carbonate powder (Softon 1500) as the aforementioned whiteness enhancer, and the powder, which crushed the polyacrylamide and went through the screen of 0.1 mesh, as the strengthening agent were added to the defibrated material in the airflow in 0.5 to 2.0% by weight as shown in Table 1. The whiteness (X-Rite528 (L value)) and the strength (JIS P 8113) of the surface of the formed sheet were evaluated. The contents of evaluation index are ○: good, Δ: passing, x: failing.

TABLE 1

| Number | Optical Sensor (level) | Whiteness Enhancer | Paper Strengthening agent | Whiteness of Sheet (L value) | Strength of Sheet |
|---|---|---|---|---|---|
| 1 | 4 | None | Polyacrylamide 1.0% | 75 | ○ |
| 2 | 4 | Softon 1500 10% | Polyacrylamide 1.0% | 80 | ○ |
| 3 | 4 | Softon 1500 15% | Polyacrylamide 1.0% | 86 | Δ |
| 4 | 4 | Softon 1500 15% | Polyacrylamide 2.0% | 85 | ○ |
| 5 | 7 | Softon 1500 10% | None | 85 | X |
| 6 | 7 | Softon 1500 5% | Polyacrylamide 0.5% | 82 | ○ |
| 7 | 7 | Softon 1500 10% | Polyacrylamide 1.0% | 88 | ○ |
| 8 | 9 | None | Polyacrylamide 1.0% | 87 | ○ |

As shown in Table 1, in Numbers 2 to 7, when the whiteness enhancer was added based on the whiteness of the stock material, the whiteness was improved in comparison with Number 1 when the whiteness enhancer was not added. Further, in Numbers 1 to 4, 6 to 8, when the strengthening agent was added, the strength can be secured.

Example 2

As shown in Example 2, a part of piping 204 in upstream side of the whiteness enhancer feeding unit is made transparent, and before feeding the whiteness enhancer, the whiteness of the defibrated material was measured by the optical sensor. The sensing quantifies the total average level in 10 level scale of 1 to 10 (1 black to 10 white).

The calcium carbonate powder (Softon 3200) as the aforementioned whiteness enhancer, and the cationic modified starch as the strengthening agent were added to the defibrated material in the airflow as shown in Table 2. The whiteness (X-Rite528 (L value)) and the strength (JIS P 8113) of the surface of the formed sheet were evaluated. The contents of evaluation index are ○: good, Δ: passing, x: failing.

TABLE 2

| Number | Optical Sensor (level) | Whiteness Enhancer | Paper Strengthening agent | Whiteness of Sheet (L value) | Strength of Sheet |
|---|---|---|---|---|---|
| 1 | 5 | None | None | 75 | X |
| 2 | 5 | Softon 3200 10% | Starch 10% | 80 | ○ |
| 3 | 5 | Softon 3200 15% | Starch 10% | 86 | Δ |
| 4 | 5 | Softon 3200 15% | Starch 15% | 87 | ○ |

As shown in Table 2, in Numbers 2 to 4, when the whiteness enhancer was added based on the whiteness of the defibrated material after defibrating, the whiteness was improved in comparison with Number 1 when the whiteness enhancer was not added. Further, in Numbers 2 to 4, when the strengthening agent was added, the strength can be secured.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A sheet manufacturing apparatus for manufacturing a sheet including defibrated material and whiteness enhancer, the sheet manufacturing apparatus comprising:
    a dry-type defibrating unit configured to defibrate in air a stock material that includes fibers;
    a whiteness enhancer feeding unit configured to feed the whiteness enhancer to the defibrated material defibrated in the dry-type defibrating unit; and
    a controller configured to change a feeding amount of the whiteness enhancer based on whiteness information of one of the stock material and the defibrated material; and
    a strengthening agent feeding unit configured to feed a strengthening agent,
    the feeding amount of the whiteness enhancer when whiteness in the whiteness information is lower than a predetermined value being larger than the feeding amount of the whiteness enhancer when the whiteness in the whiteness information is higher than the predetermined value,
    when the whiteness in the whiteness information is lower than the predetermined value and the feeding amount of the whiteness enhancer is larger, larger amount of the strengthening agent being fed in comparison with when the whiteness in the whiteness information is higher than the predetermined value and the feeding amount of the whiteness enhancer is lower.

2. The sheet manufacturing apparatus according to claim 1, wherein
    the feeding amount of the whiteness enhancer is changed based on the whiteness information of the stock material.

3. The sheet manufacturing apparatus according to claim 1, wherein
    the whiteness information is information related to the stock material.

4. The sheet manufacturing apparatus according to claim 3, wherein
    the stock material is a printed paper, and the information related to the stock material is information that indicates how the stock material has been printed.

5. The sheet manufacturing apparatus according to claim 4, wherein
    the information related to the stock material indicates that the feeding amount of the whiteness enhancer when the stock material is printed by an inkjet device is larger than the feeding amount of the whiteness enhancer when the stock material is not printed by the inkjet device.

6. The sheet manufacturing apparatus according to claim 1, wherein
    the feeding amount of the whiteness enhancer is changed based on the whiteness information of the defibrated material.

7. A method for manufacturing a sheet comprising:
    generating defibrated material by defibrating in air a stock material which includes fibers;
    acquiring whiteness information of the stock material or the defibrated material; feeding a whiteness enhancer to the defibrated material;
    changing the feeding amount of the whiteness enhancer to the defibrated material based on the whiteness information of one of the stock material and the defibrated material that has been acquired; and
    feeding a strengthening agent,
    the changing of the feeding amount of the whiteness enhancer including changing the feeding amount of the whiteness enhancer such that the feeding amount of the whiteness enhancer when whiteness in the whiteness information is lower than a predetermined value is larger than the feeding amount when the whiteness in the whiteness information is higher than the predetermined value,
    the feeding of the strengthening agent including, when the whiteness in the whiteness information is lower than the predetermined value and the feeding amount of the whiteness enhancer is larger, feeding larger amount of the strengthening agent in comparison with when the whiteness in the whiteness information is higher than the predetermined value and the feeding amount of the whiteness enhancer is lower.

* * * * *